United States Patent [19]
Reymond

[11] Patent Number: 5,426,698
[45] Date of Patent: Jun. 20, 1995

[54] TRANSFORMED CURRENT SENSING RELAY FOR USE IN SWITCHED NETWORK MODEMS AND CIRCUIT INCORPORATING SAME

[75] Inventor: Welles K. Reymond, Waterbury, Conn.

[73] Assignee: General DataComm, Inc., Middlebury, Conn.

[21] Appl. No.: 64,460

[22] Filed: May 11, 1993

[51] Int. Cl.$^6$ .................................................. H01H 51/00
[52] U.S. Cl. .................................. 379/399; 379/400; 335/151; 335/153
[58] Field of Search ................. 379/399, 400, 401, 90, 379/94; 361/88, 98, 31, 96; 335/151–156

[56] References Cited

U.S. PATENT DOCUMENTS

| | | | |
|---|---|---|---|
| 2,907,846 | 10/1959 | Wilhelm | 200/93 |
| 2,978,556 | 4/1961 | Lohs et al. | 200/104 |
| 3,242,411 | 3/1966 | Lilienfeld | 320/43 |
| 3,477,045 | 11/1969 | Sauer | 335/151 |
| 3,492,613 | 1/1970 | Van Husen | 335/151 |
| 3,602,771 | 8/1971 | Walstad et al. | 317/13 R |
| 3,643,248 | 2/1972 | Schott | 340/253 B |
| 3,793,601 | 2/1974 | Angner et al. | 335/153 |
| 4,222,020 | 9/1980 | Jameel et al. | 335/151 X |
| 4,237,345 | 12/1980 | Dotter, Jr. | 179/16 |
| 4,286,241 | 8/1981 | Olivenbaum et al. | 335/151 |
| 4,661,791 | 4/1987 | Wakasugi et al. | 335/151 |
| 4,752,754 | 6/1988 | Strauss | 335/151 |

*Primary Examiner*—James L. Dwyer
*Assistant Examiner*—M. W. Shehata
*Attorney, Agent, or Firm*—David P. Gordon

[57] ABSTRACT

A transformed current sensing relay with reduced AC impedance of the operating coil is accomplished by adding a shorted secondary winding to an otherwise conventional current sensing reed relay. The shorted secondary winding is preferably implemented with a copper tube over the existing coil and inside the magnetic circuit. This transformed current sensing relay is particularly advantageous for the line current sensing function in switched network communications equipment such as high speed modems, where the transformed relay exhibits substantially lower impedance at high frequencies than the conventional current sensing relay. This transformed current sensing relay allows for the elimination of bypass capacitors and results in significant cost and space savings. Moreover, the transformer nature of the transformed current sensing relay allows for the elimination of suppression resistors from the interface resulting in additional cost and space savings.

20 Claims, 3 Drawing Sheets

TRANSFORMED CURRENT SENSING RELAY FOR USE IN SWITCHED NETWORK MODEMS AND CIRCUIT INCORPORATING SAME

BACKGROUND OF THE INVENTION

The invention relates to switched network telecommunications. More particularly, the invention relates to a sensitive current sensing relay which detects the presence or absence of a loop current in a switched network modem interface.

In switched network modems, it is often necessary to detect the presence or absence of loop current, for example to determine whether a valid call is still in process, or whether an ancillary device such as a phone is off-hook. In switched networks, the subscriber loop is generally energized with −48 volts DC from a central office or PBX. This voltage causes loop current to flow when a valid call is in progress and "term set" (e.g., phone) is off-hook. There are generally two known ways of detecting the presence or absence of loop current: either by an LED OPTO coupler or by a current sensitive relay. Regulatory requirements as to the types of equipment which may be connected to some public telecommunications networks (e.g., international networks) have in effect mandated the use of relays rather than OPTO couplers because of the DC voltage drop allowed across the sensor. Prior art FIG. 1 shows a simplified schematic diagram of a state of the art current sensing relay in a switched network line interface.

The switched network (VF) line modem interface of prior art FIG. 1 includes port A for connecting to the network and port B for coupling a device, e.g. a phone, for use with the network. The interface and the device coupled through it to the network are generally protected by resistors $R_1$, $R_2$, fuse F and varistor MOV. Resistors $R_1$ and $R_2$ are typically 5Ω, 3 watt, wire wound resistors which are used in connection with the varistor so as to prevent damage to both the interface and to the device coupled to the network via the interface from voltage and current surges due to e.g., lightning. Also seen in FIG. 1 is an "off-hook" relay OH which couples to the analog portion of the modem which includes DC hold circuit HOLD, capacitor C, transformer T, and resistor $R_T$.

As seen in FIG. 1, a current sensing relay K1 is arranged in series between ports A and B. The current sensing relay K1 is effectively a reed relay capsule 2 having reed contacts 4 and 6. The reed relay is coupled to the core 100 of the modem which includes a demodulator (not shown), a data pump (not shown), etc., as is known in the art. The core is also typically connected to a ring detector RING 110 as shown in phantom. Regardless, with the current sensing relay arranged as shown, current flowing through the interface from port A is sensed. For example, when the device coupled to port B is "off-hook", loop current flows through the interface. The relay K1 detects this loop current and signals the modem that the port B device is already "off-hook". Also, if a correct signal is provided at port A (typically as detected by ring detector RING), the modem goes off-hook and closes switch OH. When that happens, current flows through the coil of the read relay K1, and the reed relay contacts 4 and 6 close. As long as the call is not terminated, contacts 4 and 6 will be closed. However, when the call is terminated, contacts 4 and 6 open, and this fact is determined by the modem core 100.

Relay K1 is typically a reed relay of the type shown in prior art FIG. 2. It generally comprises a reed capsule 2 containing reed contacts 4, 6 which open or close in response to a magnetic field. Capsule 2 is surrounded by a coil bobbin 8 containing a wound coil 10 which typically has approximately 800–1000 turns. A magnetic stator shield 12, typically a mu-metal foil (high permeability magnetic foil) of 2 mils thickness, is wrapped around coil 10. Relay K1, as shown in the circuit of FIG. 1, has a DC resistance $R_{K1}$ typically of 10Ω, an operating inductance $L_{K1}$ of approximately 3.5 millihenries and an impedance $|Z_{LK1}|$ at 4 KHz of approximately 88Ω (4 KHz being the bandwidth of a single voice channel in a switched network). The total DC resistance ($R_{DC}$) between ports A and B is of considerable importance both for performance and for regulatory compliance. Generally lower resistances are preferred, and it is preferred that $R_{DC} \leq 10\Omega$. In the prior art example of FIG. 1, the total $R_{DC}$ is 20Ω ($R_1 + R_2 + R_{K1}$).

The high inductance of the relay K1 is problematic because of its impedance at high frequencies (impedance being a product of inductance and frequency: $Z = 2\pi fL$). In order to reduce the impedance of relay K1 during communication, it is necessary to add electrolytic bypass capacitors $C_1$ and $C_2$ as shown in FIG. 1. For very high speed modems, $C_1$ and $C_2$ are typically chosen to be 220 microfarads each, resulting in a total capacitance of 110 microfarads: $C_{TOTAL} = (C_1 C_2)/(C_1 + C_2)$. In the circuit shown in FIG. 1, the bypass capacitors change the impedance across K1 ($Z_{K1}$) according to the equation $Z_{K1} = (Z_C)(Z_R + Z_L)/(Z_C + Z_R + Z_L)$ where $Z_C = 1/(jwC)$, $Z_L = jwL$, $Z_R = R_{K1}$, $j = \sqrt{-1}$, and w is frequency in radians per second. Thus at 4 KHz, $Z_C$ is approximately 0.362Ω, $Z_{LK1}$ is approximately 88Ω and $Z_{RK1}$ is always 10Ω. Therefore, at 4 KHz, the total impedance across relay K1 with the bypass capacitors is approximately 0.361Ω.

It will be appreciated by those skilled in the art that while the bypass capacitors serve the useful function of reducing the impedance of the relay at higher frequencies, the capacitors are relatively expensive and take up additional space in the circuit. In addition, these capacitors do nothing to reduce the total DC impedance of the circuit which is still greater than the preferred 10Ω. Also, it will be appreciated that the addition of the capacitors in parallel with the inductor $L_{K1}$ causes a parallel tuned circuit to be formed so that at a particular low frequency $f = \frac{1}{2}\pi(C_T L_{K1})^{0.5}$, the impedance of the relay can be quite high. Thus, the capacitance $C_T$ must be made large enough so that the resonant frequency is lower than the frequency of interest for the circuit.

SUMMARY OF THE INVENTION

It is therefore an object of the invention to provide a current sensing relay having lower AC impedances.

It is also an object of the invention to provide a current sensing relay which may be used in a switched network telecommunications interface without the necessity of using bypass capacitors.

It is another object of the invention to provide a transformed current sensing reed relay for use in a switched network telecommunications interface which is inexpensive to produce.

It is a further object of the invention to provide a current sensing relay which has both reduced impedance at the high end of the voice band, but provides protection against lightning surges without the use of resistor components.

It is an additional object of the invention to provide a switched network telecommunications interface incorporating a transformed current sensing reed relay that can be used as a surge impedance.

Another object of the invention is to provide a compact and inexpensive switched network modem interface.

In accord with these objects which will be discussed in detail below, the transformed current sensing relay of the present invention generally includes an otherwise standard reed relay with a shorted secondary coil wound thereabout. More particularly, the transformed current sensing relay comprises a reed switch capsule inserted in a coil bobbin, a relay coil wound around the bobbin, and a shorted secondary coil wound around the relay coil which transforms the reed relay into a "leaky transformer". A magnetic shield is wrapped around the secondary coil. The transformed current sensing relay has a lower inductance and thus a lower impedance than the prior art current sensing relays, and no bypass capacitors are needed when the transformed current sensing relay is used in a switched network telecommunications interface. As a result, the interface is considerably less expensive to produce and is more compact in size than the interface circuits of the prior art. Moreover, since the transformed current sensing relay acts like a transformer, and its equivalent series impedance is a function of frequency, other components, such as suppression resistors, can be eliminated from the interface circuit making the circuit yet smaller and even less expensive.

Preferred aspects of the invention include: forming the single turn shorted secondary transformer coil as a copper tube which slips over the coil bobbin of a conventional reed relay; and wrapping the conventional magnetic stator/shield around the secondary coil copper tube rather than around the primary coil.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 2:
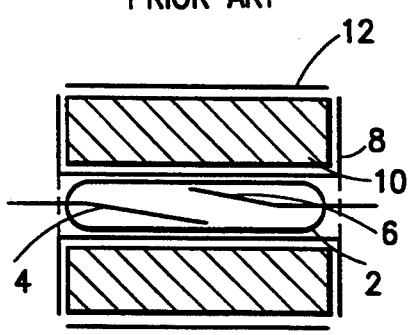
FIG. 2 is a schematic cross sectional view of a prior art reed relay used for current sensing in a switched network telecommunications interface.
Figure 3:
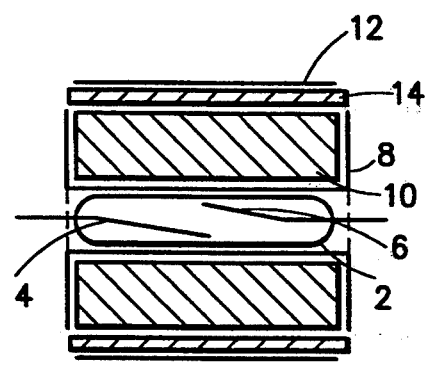
FIG. 3 is a schematic cross sectional view of a transformed current sensing reed relay according to the invention.

Referring now to prior art FIG. 2 and to FIG. 3, the transformed current sensing reed relay K2 (FIG. 3) of the present invention shares many components with the prior art reed relay K1 (FIG. 2). In both the prior art and the present invention, a reed switch capsule 2 having reed contacts 4, 6 is inserted in a coil bobbin 8. A relay coil 10 having numerous (e.g., 1,000) turns is wound around bobbin 8. In the transformed current sensing reed relay K2 of the invention, the relay coil 10 is not directly wrapped with the magnetic stator/shield foil 12 as is the prior art relay K1. Instead, a single turn shorted secondary coil 14 surrounds the relay coil 10, and a magnetic stator/shield foil 12 is wrapped around this secondary coil. The relay coil 10 is thereby transformed into the primary coil of a transformer which exhibits leaky characteristics. In particular, the transformer formed has a higher leakage inductance than most normal transformers because the magnetic circuit comprised of switch contacts 4 and 6 and the shield 12 is not closed as seen in FIG. 3. Thus, while typical transformers would have a typical magnetizing to leakage inductance ratio ($L_m/L_L$) of > 50, in the case of the transformed current sensing relay K2, this ratio is reduced to, e.g., about a value of 3.5. In accord with the preferred embodiment of the invention, the shorted secondary coil 14 is preferably a thin copper tube which fits easily over the relay coil 10 and bobbin 8. The copper tube 14 is then wrapped with the magnetic stator/shield foil 12.

Figure 4:
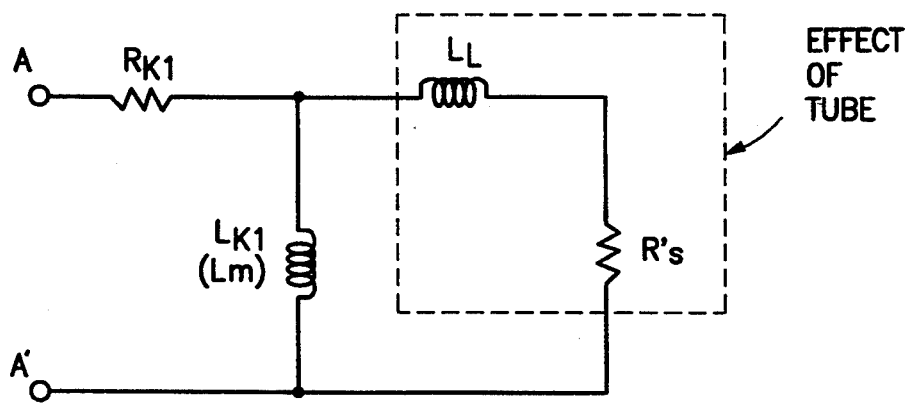
FIG. 4 is a equivalent circuit diagram for the transformed current sensing reed relay of FIG. 3.

Turning to FIG. 4, a simplified equivalent circuit of the transformed reed relay of FIG. 3 is seen. It will be appreciated that the coil of the transformed reed relay of FIG. 3 can be expressed as a series circuit having a resistor $R_{K1}$ and an inductor $L_{K1}$, as the coil has a certain resistance and provides an inductance. In the transformed reed relay, the shorted secondary winding provides another series circuit of inductor $L_L$ and resistor $R'_s$ in parallel with the inductor $L_{K1}$ (or $L_M$ which is the magnetizing inductance). As shown, inductor $L_L$ effectively represents the leakage inductance (as opposed to the physical inductance of the shorted secondary winding out of the circuit), while $R'_s$ is the reflected secondary circuit resistance (as opposed to the actual resistance of the shorted secondary winding out of the circuit).

Figure 1:
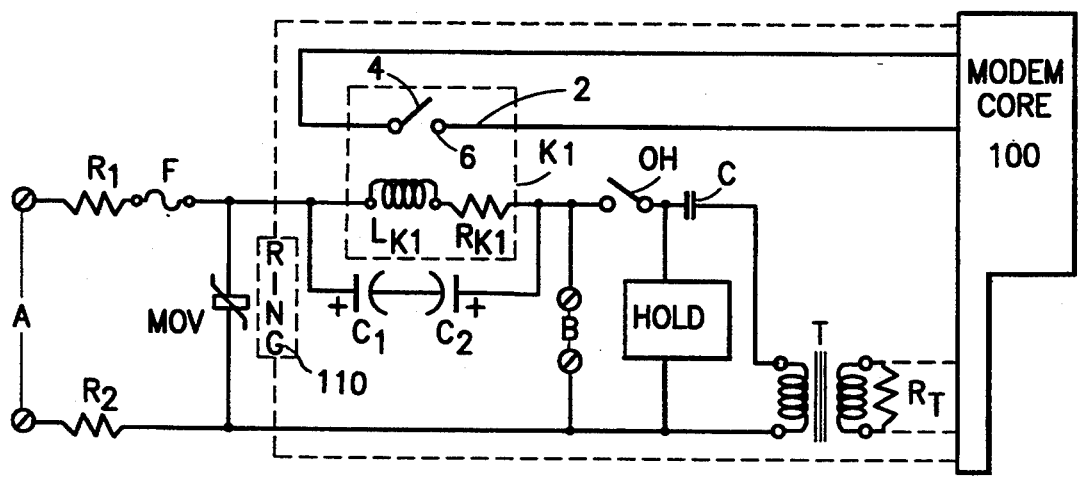
FIG. 1 is a simplified schematic diagram of a prior art switched network telecommunications interface incorporating a known current sensing relay.
Figure 5:
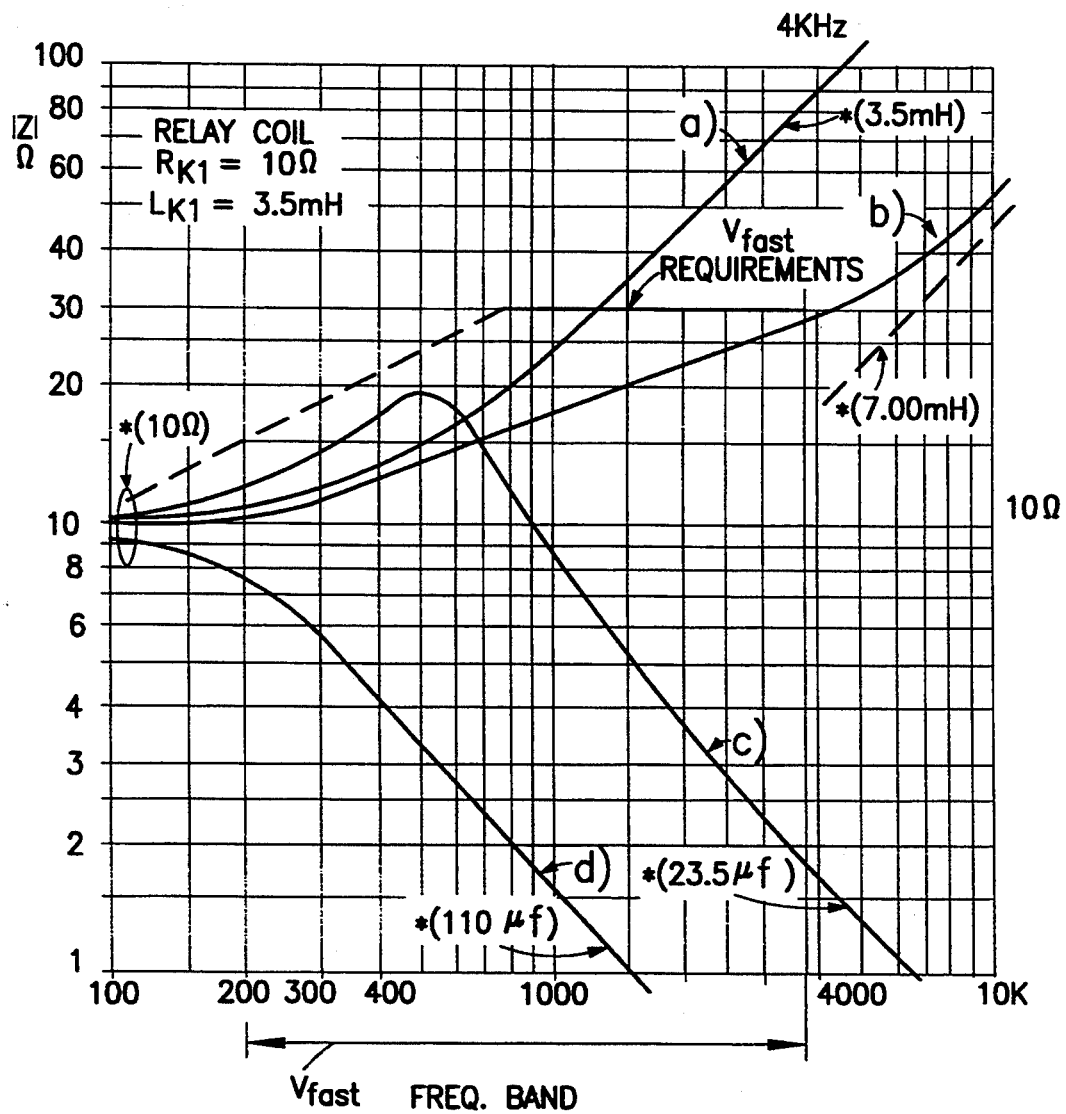
FIG. 5 is a graph plotting the effective impedances of relays with bypass capacitors of different values and the transformed current sensing reed relay of FIG. 3 against frequency.

Based on a comparison of the equivalent circuit of FIG. 4 with the equivalent circuit of the prior art reed relay circuit seen of FIG. 1 (which includes capacitors C1 and C2 in parallel with the series circuit of inductor $L_{K1}$ and resistor $R_{K1}$), it will be appreciated that the transformed relay exhibits the same DC characteristics as the relay of the prior art, as $L_{K1}$ is effectively a short circuit in the DC domain. Thus, the resistance (DC impedance) of the transformed relay is typically 10Ω. On the other hand, by comparing the equivalent circuits, it will be appreciated that the AC characteristics of the transformed relay is significantly different than that of the prior art relay. These differences may be seen with reference to FIG. 5 which compares as a function of frequency (in Hz), the impedance of a prior art relay alone (a), with the impedance of the transformed relay (b), with the impedance of the prior art relay in parallel with a 23.5 microfarad bypass capacitor (c), with the impedance of the prior art relay in parallel with a 110 microfarad bypass capacitor (d) common in the art.

Indeed, it will be appreciated that the transformed relay has the most desirable response of the different choices for very high speed modems (e.g., of the V.fast type) which function in the 200 Hz to 3800 Hz frequency band, and where impedances need to be less than about 30 ohms at 3800 Hz. The reed relay alone (a) is not desirable, as at higher frequencies, the impedance exceeds the required limit of 30 ohms. While the reed relay in parallel with a 23.5 microfarad bypass capacitor (c) meets the impedance requirements of V.fast type modems, that arrangement is still undesirable because of the resonant frequency characteristics at between 30 and 80 Hz which increase delay distortion. While the standard prior art reed relay in parallel with a 110 microfarad bypass capacitor (d) is suitable, it will be appreciated that not only must the capacitors be provided in parallel with the reed relay, but resistors (R1 and R2) must be added to provide surge impedance, as the impedance of the circuit decreases with increasing frequency. In contrast to the other arrangements, the transformed reed relay arrangement provides many desired results. First, it is seen that the transformed reed relay can be made to meet requirements (i.e., the impedance at 3800 Hz is approximately 27 ohms) without use of bypass capacitors. Second, it is seen that the impedance of the transformed reed relay increases with frequency. Thus, surge resistors are obviated.

The frequency characteristics of the transformed reed relay are dependent upon details of the secondary "coil" of the invention as well as details of the reed relay. In particular, as may be seen with reference to FIGS. 4 and 5, as the frequency of the incoming signal increases, the impedance of the circuit increases. At low frequencies, the impedance of the parallel circuit ($L_{K1}$ in parallel with $L_L$ and $R'_s$) is typically dominated by $L_{K1}$ which is typically small relative to $R'_s$. At middle frequencies, the impedance of the parallel circuit is typically a function of both paths of the parallel circuit, with $R'_s$ contributing significantly. At high frequencies, $L_{K1}$ is effectively an open circuit, and the impedance is a function of $L_L$ and $R'_s$, with $L_L$ starting to dominate as the frequency gets higher. With this understanding, the parameters of the secondary "coil" may be chosen. For example, if the resistance ($R_{K1}$) of the primary coil is about ten ohms and has an inductance of approximately 3.5 mH, and the coil has approximately 800 turns, then if the resistance of the secondary coil is approximately seventeen micro-ohms, the resistance of $R'_s$ is about eleven ohms as $Z_p = a^2 Z_s$, where $Z_p$ is the impedance of the primary coil, "a" is the ratio of primary to secondary turns, and $Z_s$ is the impedance of the secondary coil. Also, if the leakage inductance ratio is about 3.5 as described above for a leaky transformer, the reflected or leakage inductance $L_L$ is about one millihenry. Such an arrangement (i.e., $L_L = 1$ mH; $R'_s = 11$ ohms) provides the impedance/frequency characteristics shown in FIG. 5 for the transformed reed relay.

It will be appreciated that the characteristics of the transformed reed relay may be controlled by changing the characteristics of the reed relay itself (i.e., the inductance, resistance, and/or turns), and/or by changing the characteristics of the secondary coil (i.e., the resistance, turns, leakage, etc.) Thus, the impedance/frequency characteristics of the transformed reed relay are somewhat controllable for different applications.

Figure 6:
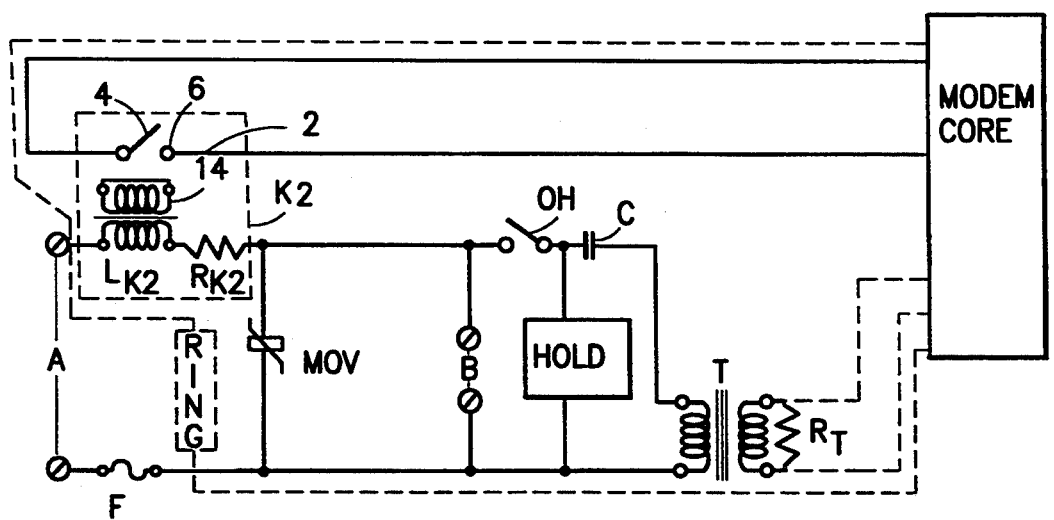
FIG. 6 is a simplified schematic diagram of a switched network telecommunications interface according to the invention.

FIG. 6 shows an exemplary circuit for a switched network telecommunications interface incorporating the transformed current sensing relay K2 of the invention. Comparing this circuit to prior art FIG. 1, it will be appreciated that bypass capacitors $C_1$ and $C_2$ and resistors $R_1$ and $R_2$ are not provided as they are not needed. Thus, it is seen that the transformed relay K2 is placed directly at the network port A in the position formerly held by resistor $R_1$. As set forth above, the enhanced properties of relay K2 allow it to be used without bypass capacitors and to take the place of suppression resistors. Compared to the prior art relay circuit in FIG. 1 which has a DC impedance of twenty ohms, the relay circuit of FIG. 6 has an improved DC impedance of only ten ohms. Also compared to the prior art relay circuit of FIG. 1 which has an impedance of approximately 10.5 ohms at a frequency of 4000 Hz, the relay circuit of FIG. 6, without resistors and capacitors an acceptable impedance at 4000 Hz of approximately 28 ohms.

There have been described and illustrated herein a transformed current sensing relay and a switched network telecommunications interface incorporating the transformed current sensing relay. While particular embodiments of the invention have been described, it is not intended that the invention be limited thereto, as it is intended that the invention be as broad in scope as the art will allow and that the specification be read likewise. Thus, while particular materials such as a copper tube for the secondary winding have been disclosed, it will be appreciated that other materials could be utilized. Also, while certain winding ratios have been mentioned, it will be recognized that other ratios could be used. Moreover, while particular configurations have been disclosed in reference to a reed switch capsule and a magnetic stator/shield foil wrap, it will be appreciated that other relay configurations could be used following principles of the invention to achieve similar results in a similar manner. In addition, while certain switched network interfaces incorporating the transformed relay of the invention have been disclosed, it will be appreciated that the transformed current sensing relay may be used in other applications as well. It will therefore be appreciated by those skilled in the art that yet other modifications could be made to the provided invention without deviating from its spirit and scope as so claimed.

I claim:

1. A transformed current sensing relay, comprising:
   a) a pair of relay contacts with at least one of said relay contacts being magnetically responsive;
   b) a relay coil which closes said pair of contacts in response to a current passing through said relay coil;
   c) a shorted secondary coil wrapped around said relay coil and inductively coupled to said relay coil such that said relay coil and said shorted secondary coil form a transformer; and
   d) a magnetic shield wrapped around said secondary coil.

2. A transformed current sensing relay according to claim 1, wherein:
   said pair of relay contacts comprise a reed switch.

3. A transformed current sensing relay according to claim 2, wherein:
   said relay coil is wound coaxially around said reed switch.

4. A transformed current sensing relay according to claim 3, wherein:
   said shorted secondary coil is wound coaxially around said relay coil.

5. A transformed current sensing relay according to claim 1, wherein:
said shorted secondary coil comprises a single turn.

6. A transformed current sensing relay according to claim 1, wherein:
said shorted secondary coil comprises a copper tube.

7. A transformed current sensing relay according to claim 1, wherein:
said relay coil has a DC impedance of approximately ten ohms or less, and an AC impedance at 3800 Hz of between ten and thirty ohms.

8. A transformed current sensing relay according to claim 4, wherein:
said shorted secondary coil comprises a single turn.

9. A transformed current sensing relay according to claim 4, wherein:
said shorted secondary coil comprises a copper tube.

10. A transformed current sensing relay according to claim 9, wherein:
said relay coil has a DC impedance of approximately ten ohms or less, and an AC impedance at 3800 Hz of between ten and thirty ohms.

11. A switched network telecommunications interface for coupling a communication device to a switched network, said interface comprising:
a) a network port;
b) a communication device port; and
c) a transformed current sensing relay in series between said network port and said communication device port, said transformed current sensing relay comprising,
  i) a pair of relay contacts, at least one of said relay contacts being magnetically responsive,
  ii) a relay coil which closes said contacts in response to a current passing through said relay coil,
  iii) a shorted secondary coil wrapped around said relay coil and inductively coupled to said relay coil such that said relay coil and said shorted secondary coil form a transformer, and
  iv) a magnetic shield wrapped around said secondary coil.

12. A switched network telecommunications interface according to claim 11, wherein:
said pair of relay contacts comprise a reed switch.

13. A switched network telecommunications interface according to claim 12, wherein:
said relay coil is wound coaxially around said reed switch.

14. A switched network telecommunications interface according to claim 13, wherein:
said shorted secondary coil is wound coaxially around said relay coil.

15. A switched network telecommunications interface according to claim 11, wherein:
said shorted secondary coil comprises a single turn.

16. A switched network telecommunications interface according to claim 11, wherein:
said relay coil has a DC impedance of approximately ten ohms or less, and an AC impedance at 3800 Hz of between ten and thirty ohms.

17. A switched network telecommunications interface according to claim 11, wherein:
said shorted secondary coil comprises a copper tube.

18. A switched network telecommunications interface according to claim 11, in combination with a modem coupled to said communication device port.

19. A switched network telecommunications interface according to claim 14, wherein:
said relay coil has a DC impedance of approximately ten ohms or less, and an AC impedance at 3800 Hz of between ten and thirty ohms.

20. A switched network telecommunications interface according to claim 19, wherein:
said shorted secondary coil comprises a copper tube.

* * * * *